R. O. HUNTER.
CULTIVATOR FENDER.
APPLICATION FILED NOV. 20, 1915.
1,210,073.
Patented Dec. 26, 1916.
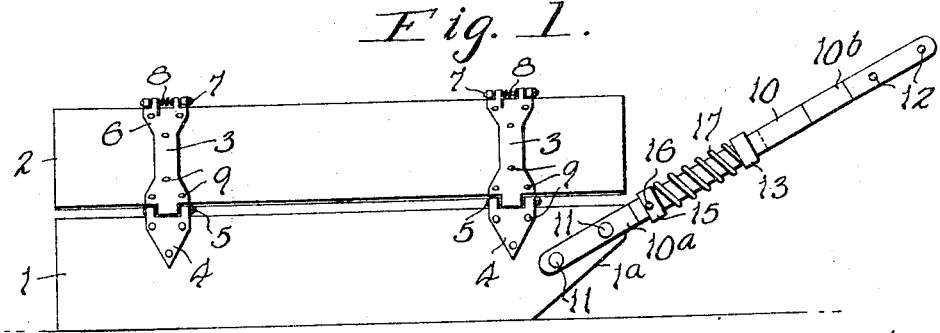
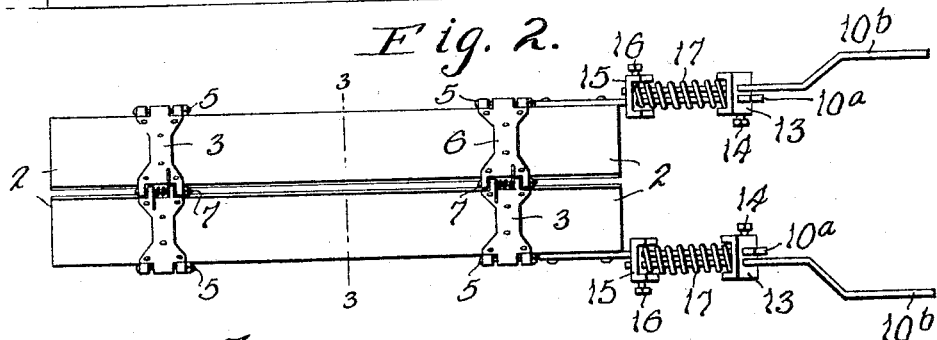
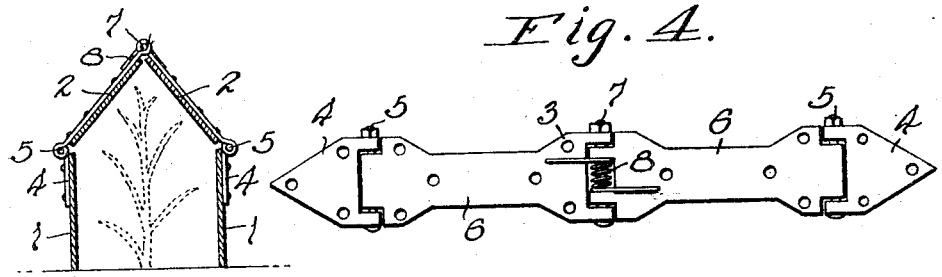
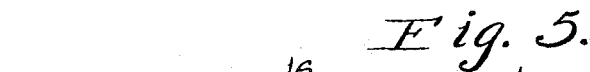
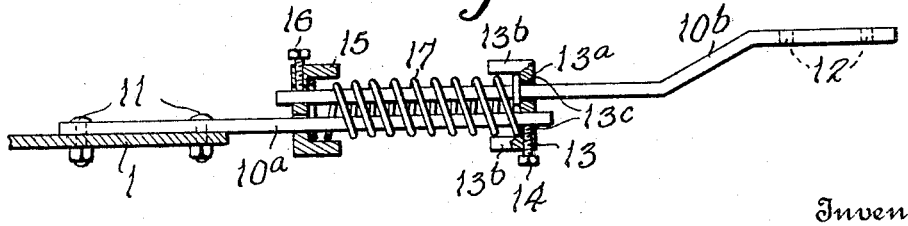
Inventor
R. O. HUNTER
By N. S. Kiele
Attorney

UNITED STATES PATENT OFFICE.

ROY O. HUNTER, OF VENUS, NEBRASKA.

CULTIVATOR-FENDER.

1,210,073.  Specification of Letters Patent.  Patented Dec. 26, 1916.

Application filed November 20, 1915. Serial No. 62,526.

*To all whom it may concern:*

Be it known that I, ROY O. HUNTER, a citizen of the United States, residing at Venus, in the county of Knox and State of Nebraska, have invented a new and useful Cultivator-Fender, of which the following is a specification.

The present invention relates to certain new and useful improvements in plow and cultivator fenders such as are utilized as shields or guards for plants during cultivation to prevent the same from being covered up by the earth loosened by the plow or cultivator shares, one object of the invention being to provide a device of the character described which embodies novel features of construction whereby the loose earth is prevented from covering the plant from the top by falling over the top edges of the fenders now commonly in use, as well as completely protecting the plant from the sides.

Further objects of the invention are to provide means whereby the fender is yieldably mounted upon the cultivator so as to readily pass over rough ground without catching or sudden jerking upon the cultivator, and whereby the fender will readily accommodate itself to various hollows or lumps in the earth.

Still further objects are to provide a device of this character which is comparatively simple and inexpensive in its construction, which can be easily and quickly applied to or removed from the cultivator, and which is so constructed as to easily collapse when removed from the cultivator.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which—

Figure 1 is a side elevation of a cultivator fender constructed in accordance with the invention. Fig. 2 is a top plan view thereof. Fig. 3 is a transverse vertical sectional view taken on the line 3—3 of Fig. 2. Fig. 4 is a detail view of one of the hinge connections for the various plates of the fender, removed from the fender and placed in a flat condition. Fig. 5 is a detail top plan view of one of the yielding bars for connecting the fender to the cultivator.

Corresponding and like parts are referred to in the following description and indicated in all the views of the drawings by the same reference characters.

Specifically describing the present embodiment of the invention the numeral 1 designates opposed side plates which are vertically arranged and are adapted to travel upon the surface of the ground upon opposite sides of the plants to be cultivated, as clearly shown by Fig. 3, the plant being shown by dotted lines. The front lower edges of these side plates are beveled at $1^a$ to allow the side plates to easily travel over the ground without sticking into or catching upon the same so as to hinder the movement of the side plates thereover. Superposed upon the upper longitudinal edges of these side plates 1 are a pair of top plates 2 which converge inwardly toward each other so as to form a substantially inverted V-shaped canopy. These plates 1 and 2 are hingedly connected to each other by a pair of hinge members 3, the said hinge members being formed of four hingedly connected parts, one of which is rigidly connected to each of the plates 1 and 2 of the fender. These hinge members are clearly illustrated by Fig. 4 and are secured to the plates of the fender near the opposite ends thereof by any suitable means such as the rivets 9. Each of the hinge members 3 is provided at opposite ends thereof with a plate 4 which is adapted to be secured to the corresponding side plate 1, as shown by Fig. 1. The inner ends of the plates 4 are hingedly connected by a pintle or pivot bolt 5 to one end of a strap 6, the said straps 6 being rigidly applied to the corresponding top plate 2. The opposite ends of the straps 6 are pivotally connected at the top of the fender by a pintle or pivot bolt 7, the said bolt carrying a coil spring 8, each of the ends of which engages and rests upon one of the straps 6. With this construction it will be obvious that each of the plates 1 and 2 may move about the pintles or bolts 5 and 7 independently of the other plates, and that the spring normally tends to force the top plates 2 together. Owing to the fact that these plates 2 are connected to the plates 1, it will be seen that if the said plates 1 are prevented from moving the spring 8 will tend to raise the meeting edges of the plates 2 which may swing about the pintles 7. This action of the spring 8 thus tends to keep the top plates 2 inclined toward each other in an elevated position so as to form an inverted V-shaped canopy or top for the fender, as shown by Fig. 3. The fender may thus be dragged over the plants with the side plates 1 disposed upon opposite sides thereof, the spring 8 holding the top plates 2 clear of the top of the plants so as to do no damage thereto. This hinged connection of the plates 1 and 2 also allows the same to be collapsed upon each other, so that the fender will occupy a minimum amount of space when removed from the cultivator.

The fender is adapted to be secured to the cultivator or plow by any desired means, although in the present instance one particularly desirable method is shown. A pair of bars 10 project upwardly and forwardly from the forward ends of the side plates 1, one end of the said bars being rigidly secured to the said plates 1 by bolts 11, while the opposite ends are provided with openings 12 adapted to receive bolts or other suitable means for securing them to the beams of a cultivator or plow, not shown. If desired these bars 10 may be constructed of one piece, although a desirable construction is to form the bars of two yieldably and relatively slidable sections $10^a$ and $10^b$ as shown. The section $10^a$ has one end thereof rigidly connected to the corresponding side plate 1 by means of the bolts 11, the opposite end thereof having adjustably and detachably applied thereto a guide member 13. This guide member has a channel formation comprising a base $13^a$ and end flanges $13^b$. The base $13^a$ has provided therein a pair of similarly formed openings $13^c$, the said openings being a little larger than the cross section of the bars $10^a$ and $10^b$. One of the openings is adapted to receive the free end of the bar $10^a$, the said bar being secured therein by means of a set screw 14 carried by the guide 13 and screwed into a snug engagement with the bar $10^a$. The other opening is adapted to slidably receive the intermediate portion of bar $10^b$. One end of this bar $10^b$ is provided with openings 12 adapted to receive bolts to secure the same to the cultivator, while the opposite end of the said bar carries a guide 15 of exactly the same construction as the guide 13, the said guide being provided with openings similar to the slots $13^c$ of the guide 13, one of which receives the free end of the bar $10^b$ which is rigidly secured therein by a set screw 16, while the other opening slidably engages the intermediate portion of the bar $10^a$. These guides 13 and 15 are arranged upon the bars $10^a$ and $10^b$ with their flanges facing each other, and a spring 17 surrounds the two bars $10^a$ and $10^b$ and is interposed between the base portions of the two guides 13 and 15, the flanges of the said guides serving as seats for the ends of the spring 17. With this construction it will be obvious that the two bars $10^a$ and $10^b$ may have a relative longitudinal sliding movement, the spring 17 serving to yieldably resist this movement, and the spring allowing the fender to fall into the hollows or ride over the lumps with a resilient movement, thereby relieving both the fender and cultivator from sudden or sharp strains. Furthermore, the slidable and adjustable arrangement of the guides 13 and 15 allows the fender to be adjusted longitudinally of the cultivator as may be desirable to cause it to coöperate most effectively with the shares of the cultivator. Should it be desired to use the fender so that the lower edges of the side plates 1 would not touch the ground, thus allowing the earth to pass beneath them, the guides may be adjusted and the bars $10^a$ pushed forwardly upon the bars $10^b$ to the desired position.

In normal operation the fender is arranged to be dragged along the ground between the two series of cultivator shares or hoes, which are arranged upon opposite sides of the row of plants to be cultivated, with the side plates 1 disposed between the corresponding cultivator shares and the row of the plants and upon opposite sides of the plants, the top plates 2 being arranged over the tops of the plants, as shown by Fig. 3. The earth loosened by the shares of the cultivator is forced against the sides and top of the fender, and, as the fender passes along is distributed behind it about the roots of the plants, the earth sliding from the sides and top of the fender. The plant is prevented from being knocked over by the side plates 1 and the top plates 2 prevent the earth from burying the same. The hinged arrangement of the plates of the fender allows one side thereof to rise and fall with the corresponding cultivator beam to which it is fastened as caused by irregularities in the ground without affecting the other side of the fender, and the yielding and sliding arrangement of the bars 10 allows the whole fender to ride easily and smoothly over the earth without sudden or sharp strains upon either the fender or the cultivator.

Having thus described the invention, what I claim as new and desire to secure by Letters Patent, is:—

1. A device of the character described including side plates, and a top or canopy hingedly connected to both of the side plates.

2. A device of the character described including a pair of side plates adapted to be arranged upon opposite sides of a plant, and a pair of top plates, each of which is hingedly connected to one of the side plates, the said top plates being adapted to be arranged over the top of the plant.

3. A device of the character described including a pair of side plates adapted to be arranged upon opposite sides of a plant, a top or canopy hingedly connected to both of the side plates, and yielding means for normally holding the top in an elevated position over the plant.

4. A device of the character described including a pair of side plates adapted to be arranged upon opposite sides of a plant, and a pair of top plates adapted to be arranged over the top of the plant and connected to said side plates, said top plates being also hingedly connected together.

5. A device of the character described including a pair of side plates adapted to be arranged upon opposite sides of a plant, a pair of top plates hingedly connected together, and each of which is hingedly connected to one of the side plates, and spring means for holding the top plates in an elevated position over the top of the plant.

ROY O. HUNTER.

Witnesses:
 JULIA OLD HUNTER,
 DOLLIE OLD.

Copies of this patent may be obtained for five cents each, by addressing the "Commissioner of Patents, Washington, D C."